United States Patent [19]

Burrell

[11] Patent Number: 5,022,452

[45] Date of Patent: Jun. 11, 1991

[54] ROLLING FIRE DOOR

[76] Inventor: Jere S. Burrell, 337 E. Steels Corners Rd., Cuyahoga Falls, Ohio 44223

[21] Appl. No.: 447,804

[22] Filed: Dec. 8, 1989

[51] Int. Cl.[5] .......................... B01D 1/22; B01D 1/14

[52] U.S. Cl. .......................................... 160/7; 160/296; 160/8

[58] Field of Search ......................... 160/2, 6, 8, 9, 296

[56] References Cited

U.S. PATENT DOCUMENTS

| | | | |
|---|---|---|---|
| 1,621,951 | 3/1927 | Perkins | 160/8 |
| 1,715,424 | 6/1929 | Ohno | 160/8 |
| 3,261,590 | 7/1966 | Bech | 182/238 |
| 3,685,567 | 8/1972 | Pemberton | 160/8 |
| 4,147,197 | 3/1979 | Bailey | 160/8 |
| 4,520,900 | 6/1985 | Orgeron | 182/233 |
| 4,616,735 | 10/1986 | Orgeron | 182/233 |

FOREIGN PATENT DOCUMENTS

| | | | |
|---|---|---|---|
| 319811 | 9/1929 | United Kingdom | 160/296 |

*Primary Examiner*—Reinaldo P. Machado

*Attorney, Agent, or Firm*—Renner, Kenner, Greive, Bobak Taylor & Weber

[57] ABSTRACT

A rolling fire door consists of a plurality of interconnected fireproof slats forming a curtain which is received by a pair of tracks along the sides of an opening to be secured. A torsion spring assembly assists in the raising and lowering of the curtain during normal operation. A torsion spring tube, rotated by raising and lowering of the curtain, is connected to a hydraulic pump. Upon the sensing of smoke, fire or the like, the torsion spring mechanism is disengaged and the curtain begins to fall by its own weight within the pair of tracks. The falling of the curtain rotates the torsion spring tube and accordingly drives the hydraulic motor which includes a restriction providing a load to the rotation of the torsion spring tube, thereby restricting the rate of descent of the curtain.

12 Claims, 1 Drawing Sheet

ROLLING FIRE DOOR

TECHNICAL FIELD

The invention herein resides in the art of security devices and, more particularly, to a fire door adapted for securing an opening to prevent the spread of fire from one area to another. Specifically, the invention relates to a fire door consisting of a curtain which comprises a plurality of individual fireproof slats which are positioned to roll downwardly in a pair of tracks to secure the opening upon the sensing of fire, smoke or the like.

BACKGROUND ART

It is well known that the implementation of fire doors within buildings and other structures provides a means for restricting and/or retarding the spread of fire from one area to another in the event such a catastrophe occurs. Previously known fire doors have typically relied upon mechanical stepping ratchets and/or cams to allow the fire door to drop to secure the opening. However, such prior art structures have been given to failure, and have been found to occasionally jam or otherwise cease working. To avoid this problem, the prior art has suggested the implementation of friction discs, operating as clutch discs or the like, to provide a means for retarding the rate at which the fire door drops or closes. However, this type of structure has been found to be quite sensitive to adjustments, with the friction discs operating in a fluid bath which is not given to adjustability to accommodate various rates of closure. Additionally, such structure is complex in structure and operation, and expensive to manufacture.

It is most desirable that overhead fire doors include mechanisms for controlling the rate of closure for the purpose of providing safety to inhabitants of the building who might otherwise be pinned beneath a rapidly closing door, and to further prevent damage or buckling to the door itself which would inhibit its utility. However, for the reasons presented above the prior art is incapable of efficiently and effectively controlling such closure rate, and is itself given to failure in operation and extensive costs in manufacture.

DISCLOSURE OF THE INVENTION

In light of the forgoing, it is a first aspect of the invention to provide a rolling fire door in which the rate of closure is controlled by a hydraulic pump.

Another aspect of the invention is to provide a rolling fire door which may be used as an access or service door by simply bypassing the closure control mechanism when desired.

Still a further aspect of the invention is the provision of a rolling fire door in which the rate of closure is easily regulated.

Another aspect of the invention is the provision of a rolling fire door in which a spring mechanism normally employed for assisting in opening and closing the fire door can be disengaged in the event of employment of the fire door.

Still a further aspect of the invention is the provision of a rolling fire door which is reliable and durable in operation, readily conducive to implementation with presently existing structure and components, and which is cost effective in manufacture and use.

The forgoing and other aspects of the invention which will become apparent as the detailed description proceeds are achieved by a rolling fire door, comprising: a curtain of a plurality of interconnecting slats; a pair of tracks receiving said curtain along lateral edges thereof; a tube traversing said pair of tracks at a top end thereof and interconnected to said curtain, rotation of said tube in a first direction raising said curtain in said pair of tracks, and rotation of said tube in a second direction allowing said curtain to be lowered in said pair of tracks; and control means connected to said tube for restricting and regulating a rate of decent of said curtain within said pair of tracks under its own weight.

Other aspects of the invention which will become apparent hereinafter are attained by a fire door, comprising: a pair of spaced apart tracks; a tube positioned above said tracks; a curtain of a plurality of elongated fireproof members connected to said tube, rotation of said tube raising and lowering said curtain within said tracks; a hydraulic pump connected to and driven by said tube; and flow control means interposed within a hydraulic flow path of said pump for restricting flow of hydraulic fluid through said path and impeding rotation of said tube.

DESCRIPTION OF DRAWING

For a complete understanding of the objects, techniques and structure of the invention reference should be made to the following detailed description and accompanying drawing wherein.

BEST MODE FOR CARRYING OUT THE INVENTION

Figure 1:
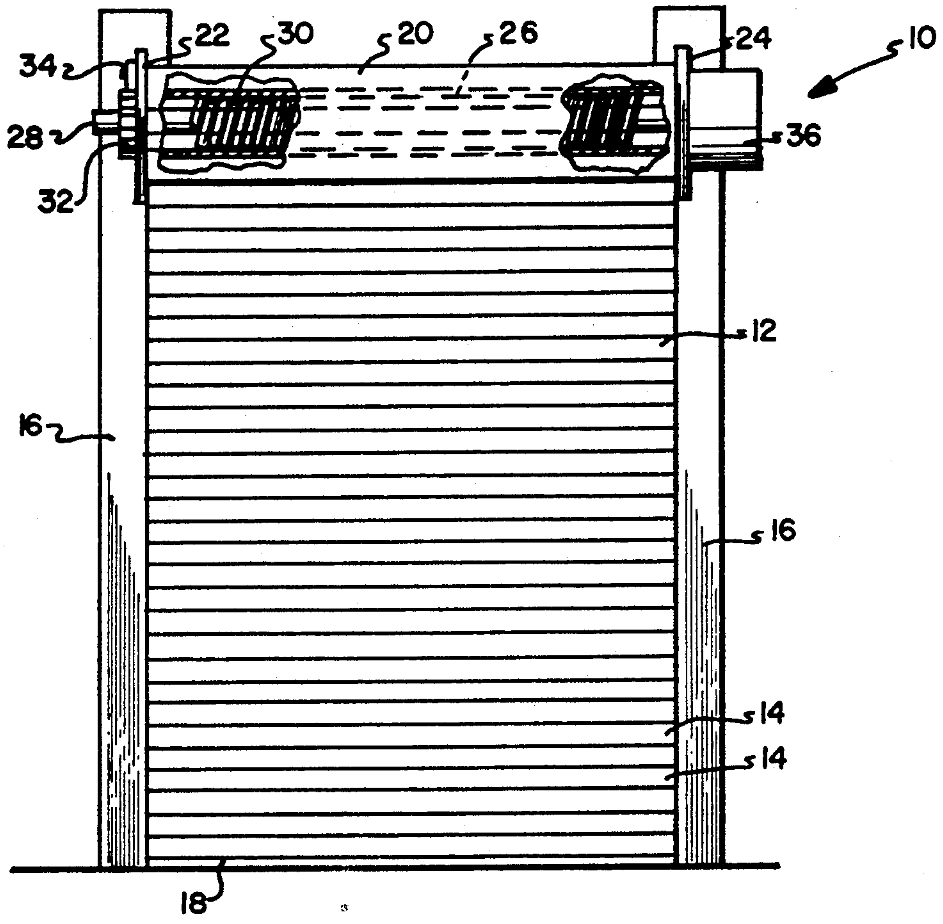
FIG. 1 is a front elevational view of the rolling fire door of the invention.

Referring now to the drawing and more particularly FIG. 1, it can be seen that a fire door according to the invention is designated generally by the numeral 10. The fire door 10 consists of a curtain 12 formed from a plurality of interconnected metallic slats 14. While it is preferred that the slats 14 be of a metallic nature, other fireproof or fire retardant material might be employed. In any event, the curtain 12 is received along lateral edges thereof by side tracks 16, preferably fabricated from channel material and having ways therein for receiving the curtain 12. For purposes of strength and rigidity, a base plate 18, of extruded channel material or the like, traverses the bottom of the curtain 12 and provides a bottom edge to the fire door 10.

A hood 20 is positioned at a top end of the tracks 16 and is closed at opposite ends thereof by a pair of head plates 22, 24. The hood 20 provides a receptacle for receiving and maintaining the curtain 12 when it is rolled upward along the tracks 16 in a fashion not unlike a standard roll top desk.

A torsion spring tube 26 is maintained within the hood 20 and is rotatable about an axis between the head plates 22, 24. The curtain 12 is connected to the spring tube 26 and wrapped thereupon when the curtain 12 is raised, and dispensed therefrom when the curtain 12 is lowered. A rod 28 passes axially into or through the torsion spring tube 26. In somewhat standard fashion, a torsion spring 30 has one end thereof connected to the rod 28 and the other end to the torsion spring tube 26. Accordingly, relative rotational movement between the spring tube 26 and curtain rod 28 either stores energy in the torsion spring 30, or allows the discharge of energy therefrom. Typically, lowering of the curtain 12 will apply a torsional force to the spring 30 to impart energy thereto, while raising of the curtain 12 will be assisted by the discharge of energy from the spring 30, assisting in rotation of the curtain rod 28 to which the curtain 12 is attached.

A ratchet or lug ring 32 is fixed to one end of the rod 28. A pawl or lug 34 is fixed to the end plate 22 and in engagement with the rachet or lug ring 32. The pawl or lug 34 prevents rotation of the ratchet or lug ring 32 and the attached rod 28. Accordingly, when the curtain 12 is lowered, the spring 30 is loaded by the transfer of force from the rotating torsion spring tube 26 to the torsion spring 30 which is fixed to the nonrotating rod 28. This stored energy then provides the force necessary to assist the user in lifting the curtain 12 since the stored spring force is postured to assist rotation of the tube 26 in the takeup direction. In like manner, when the curtain 12 is being lowered, the force dissipated in loading the spring 30 impedes the downward motion of the curtain 12, requiring either a manual or motor force to actually lower the curtain.

As part and parcel of the invention, a hydraulic governor 36 is connected to the curtain rod 28 at the head plate 24 to control the descent rate of the curtain 12 in the event of a fire or a sensed hazardous condition. In a preferred embodiment of the invention, the lug 34 is of a eutectic fusible material which weakens and breaks at a characteristic temperature, disengaging the ratchet or lug ring 32, and thereby allowing the rod 28 to rotate under the force of the spring 30 to dissipate the spring energy. Accordingly, if the curtain 12 is up in its stored position within the hood 20, it will then drop by its own weight along the tracks 16. It is contemplated that the lug 34 may also be a solenoid plunger actuated by a smoke detector or the like such that the plunger is withdrawn from the ratchet or lug ring 32 to allow such rotation upon the sensing of smoke or other predetermined conditions. In such an embodiment, the plunger may be actuated for a short period of time sufficient to allow the lug wheel 32 to rotate through a restricted arc sufficient to allow the curtain 12 to drop by its own weight, but without a full release of restrictive spring force.

It should be appreciated that if the lug or solenoid pin 34 is disengaged from the ratchet or lug ring 32, it is important that the rate of descent of the curtain 12 be controlled. This control is necessary to prevent any injury to those within the building employing the fire door 10, as well as to prevent damage to the unit itself, rendering it inoperative for its intended purposes. Accordingly, the specific structure of the hydraulic governor 36 is devised as shown in FIG. 2.

Figure 2:
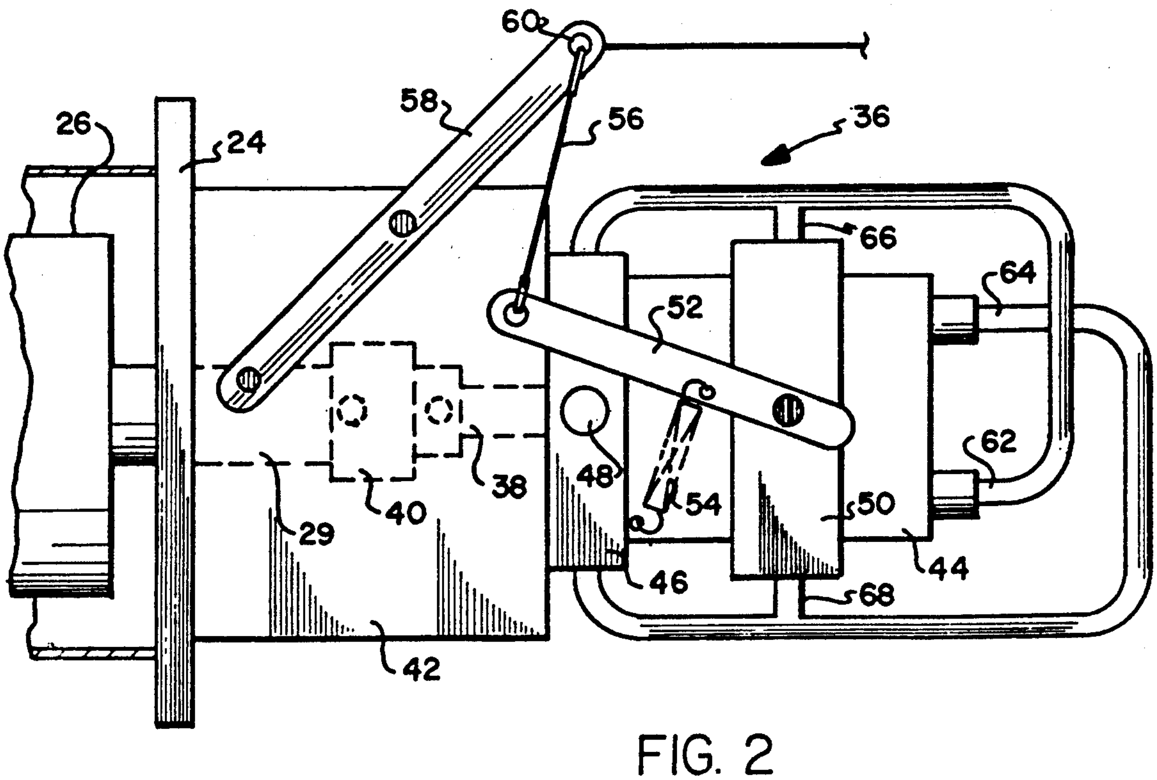
FIG. 2 is a detailed front elevational view of the hydraulic governor employed with the rolling fire door of the invention.

With reference now to FIG. 2, it can be seen that the hydraulic governor 36 receives an axle 29 extending from the tube 26 and interconnects the same to a hydraulic pump shaft 38 by means of a coupler 40. Such interconnection is preferably achieved within a housing 42 of sheet metal or other appropriate construction, such housing being attached to the head plate 24.

A hydraulic pump or motor 44 is driven by rotation of the hydraulic pump shaft 38, which is caused to rotate in unison with the curtain rod 28. A flow control valve 46 is provided in association with the hydraulic pump 44, and is provided with an adjustment knob 48 to regulate, set and adjust a restriction within a flow path of the pump 44. A bypass valve 50 is interposed in the hydraulic flow path and in shunt with the flow control valve 46 to selectively bypass the flow control valve 46 in a manner to be discussed later. Suffice it to say that a lever arm 52 is connected to the bypass valve 50 to selectively open or close the same, the lever arm 52 being connected to a bias spring 54, urging the valve 50 into a normally closed position such that the flow control valve 46 is normally in the flow path. An appropriate linkage 56, such as a chain, wire, rod or the like, is connected to one end of the lever arm 52, and passes through an aperture 60 within a fixed bracket 58. Accordingly, manual actuation of the bypass valve 50 may be achieved by simply pulling on the linkage 56 in the apparent fashion.

As shown, the hydraulic pump 44 has an outlet tube 62 and an inlet tube 64. The outlet tube 64 connects to the flow control valve 46, and by the "T" connection 66 to the bypass valve 50. In like manner, the inlet tube 64 is connected to the opposite side of the flow control valve 46, and by the "T" connection 68 to the other side of the bypass valve 50.

It will be appreciated that when the bypass valve 50 is opened, it shunts the flow-control valve 46 by routing hydraulic fluid driven by the pump 44 from the outlet tube 62, through the "T" connection 66, through the bypass valve 50, out of the "T" connection 68, and into the inlet tube 64. In this mode of operation, the hydraulic pump 44 is free-wheeling, being unrestricted by the flow control valve 46. In such a mode of operation, the curtain 12 may be opened and lowered in standard fashion as a typical access door, being assisted and retarded only by the torsion spring 30, tube 26, and rod 28. No restriction on the operation of the curtain 12 is achieved by the pump 44.

When the valve 50 is in its normally closed position as by the urging of the spring 54 on the lever arm 52, the hydraulic fluid from the pump 44 is urged from the outlet tube 62, through the top end of the flow control valve 46, out the bottom end of the flow control 46, and into the inlet tube 64 to the pump 44. Accordingly, in this posture a load is presented on the rotation of the spring tube 26, such load being determined by the adjustment of the knob 48 of the flow control valve 46. The restriction of the flow path provided by adjustment of the knob 48 accordingly controls the rate of rotation of the shaft 38 and tube 26 and, accordingly, the rate of descent of the curtain 12. Obviously, the load imparted to the curtain 12 and tube 26 can be adjusted by means of the knob 48 to attain a desired rate of descent dependent upon the weight of the curtain 12 employed, inherent function of the system, and other related parameters.

It should be appreciated that the curtain 12 can thus operate as a general access door by simply opening the valve 50, or can be postured as a rolling fire door by allowing the valve 50 to remain closed. In operation, with the valve 50 opened, the operation of the curtain 12 as an access door is under the normal control of the torsion spring 30 which assists the opening and retards the closing of the door, such that a manual force must be imparted to the curtain 12 in both the raising and lowering operation. With the curtain 12 raised and stored within the hood 20, the valve 50 is closed by release of the linkage 56 and the curtain 12 is positioned to function as a fire door. Upon sensing of heat, smoke, or other predetermined condition, the lug 34, whether of a fusible eutectic material, or a solenoid actuated pin, disengages the lug ring 32. This disengagement allows free rotation of the rod 28 with respect to the spring tube 26, unloading the spring 30 and allowing the weight of the curtain 12 to cause its descent at a rate determined by the restriction in the flow path of the hydraulic pump 44 as determined by the flow control valve 46.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A rolling fire door, comprising:

a curtain of a plurality of interconnected slats;

a pair of tracks receiving said curtain along lateral edges thereof;

a tube traversing said pair of tracks at a top end thereof and interconnected to said curtain, rotation of said tube in a first direction raising said curtain in said pair of tracks, and rotation of said tube in a second direction allowing said curtain to be lowered in said pair of tracks; and control means, comprising a hydraulic pump connected to and driven by said tube for restricting and regulating a rate of descent of said curtain within said pair of tracks under its own weight and a flow control valve interposed in a flow path of said hydraulic pump, said flow control valve restricting flow through said flow path and thereby providing a load on said hydraulic pump and restricting rotation of said tube, said control means being adjustable to regulate said load, and further comprising a bypass valve within said flow path, said bypass valve being in shunt with said flow control valve, said hydraulic pump becoming free wheeling upon actuation of said bypass valve.

2. The rolling fire door according to claim 1, further comprising spring means interconnected with said tube for assisting in raising and lowering said curtain within said pair of tracks.

3. The rolling fire door according to claim 2, wherein said control means is connected to said spring means and operatively disconnects said spring means from said tube upon occurrence of a predetermined event.

4. The rolling fire door according to claim 3, wherein said spring means comprises a torsion spring interposed between said tube and a rod, rotation of said rod being restricted and allowed by said control means.

5. The rolling fire door according to claim 3, wherein said control means comprises a hydraulic pump.

6. The rolling fire door according to claim 5, wherein said hydraulic pump is driven by said tube.

7. A fire door, comprising:

a pair of spaced apart tracks;

a tube positioned above said tracks;

a curtain of a plurality of elongated fire proof members connected to said tube, rotation of said tube raising and lowering said curtain within said tracks;

a hydraulic pump connected to and driven by said tube; and flow control means interposed within a hydraulic flow path of said pump for restricting flow of hydraulic fluid through said path and impeding rotation of said tube, said flow control means comprising an adjustable restricting valve within said path and a bypass valve within said path and in shunt with said adjustable restricting valve, opening of said bypass valve causing said hydraulic pump to be free wheeling, unimpeding rotation of said tube.

8. The fire door as recited in claim 7, further comprising spring means interconnected with said tube, said spring means assisting in raising and lowering said curtain.

9. The fire door as recited in claim 8, further comprising means connected to said spring means for selectively disengaging said spring means from said tube.

10. The fire door as recited in claim 9, wherein said spring means comprises a torsion spring interconnected between said tube and a rod.

11. The fire door as recited in claim 10, wherein said means for disengaging said spring means comprises a eutectic pin operatively engaging said rod and preventing rotation thereof, said eutectic pin failing at a predetermined temperature.

12. The fire door as recited in claim 10, wherein said means for disengaging said spring means comprises a solenoid actuated pin.

* * * * *